United States Patent

Schlievert

[15] 3,675,601
[45] July 11, 1972

[54] SEED DISPENSING APPARATUS

[72] Inventor: Lester R. Schlievert, Rte. 2, Box 165, Curtis, Ohio 43412

[22] Filed: Aug. 17, 1970

[21] Appl. No.: 64,307

[52] U.S. Cl................................111/51, 111/73, 47/9, 221/185
[51] Int. Cl...............................................A01c 7/18
[58] Field of Search...............111/8, 10, 34, 36, 37, 51, 111/73, 80; 47/9

[56] References Cited

UNITED STATES PATENTS

| 232,204 | 9/1880 | Prairie | 111/73 |
| 324,514 | 8/1885 | Applewhite | 111/73 |
| 1,067,175 | 7/1913 | Johnson | 111/51 |
| 2,605,589 | 8/1952 | Kuestner | 47/9 |
| 3,220,370 | 11/1965 | Smith | 111/51 |
| 3,467,278 | 9/1969 | Williams | 47/9 |
| 3,468,267 | 9/1969 | Morris et al. | 111/73 |

Primary Examiner—Robert E. Pulfrey
Assistant Examiner—C. W. Hanor

[57] ABSTRACT

A device consisting of a wheel and hopper arrangement for properly dropping seed in an orderly spaced way. This device includes a wheel having radially spaced apart openings, the wheel being affixed to an axle on a frame of a vehicle, the frame supporting a seed hopper and a sand hopper, the sand being placed with the seed upon the soil to allow easy breakthrough of the seedlings.

1 Claim, 3 Drawing Figures

PATENTED JUL 11 1972 3,675,601

INVENTOR.
LESTER SCHLIEVERT

SEED DISPENSING APPARATUS

This invention relates to seed planting devices, and more particularly to a seed planting apparatus which will space the seed upon the ground.

It is therefore the primary purpose of this invention to provide a seed planting apparatus which will include an apertured wheel, the openings being radially and equally spaced apart to allow for the proper spacing of the seed, the seed being gravity fed into the apertures.

Another object of this invention is to provide a planting apparatus which will have the wheel mounted to a frame portion of a vehicle and will have seed and sand hopper means for planting both seed with the sand, the sand serving to allow for easier breakthrough of the seedlings through the soil.

A further object of this invention is to provide an apparatus of the type described wherein the seed and the sand are gravity fed from the interior of the wheel portion of the apparatus.

A still further object of this invention is to provide a seed planting apparatus of which the seed and the sand both are dispensed by sprocket regulating means.

Other objects of this invention are to provide a seed planting apparatus which is simple in design, inexpensive to manufacture, rugged in construction, easy to use and efficient in operation.

These and other objects will be readily evident upon a study of the following specification and the accompanying drawing, wherein.

Figure 1:
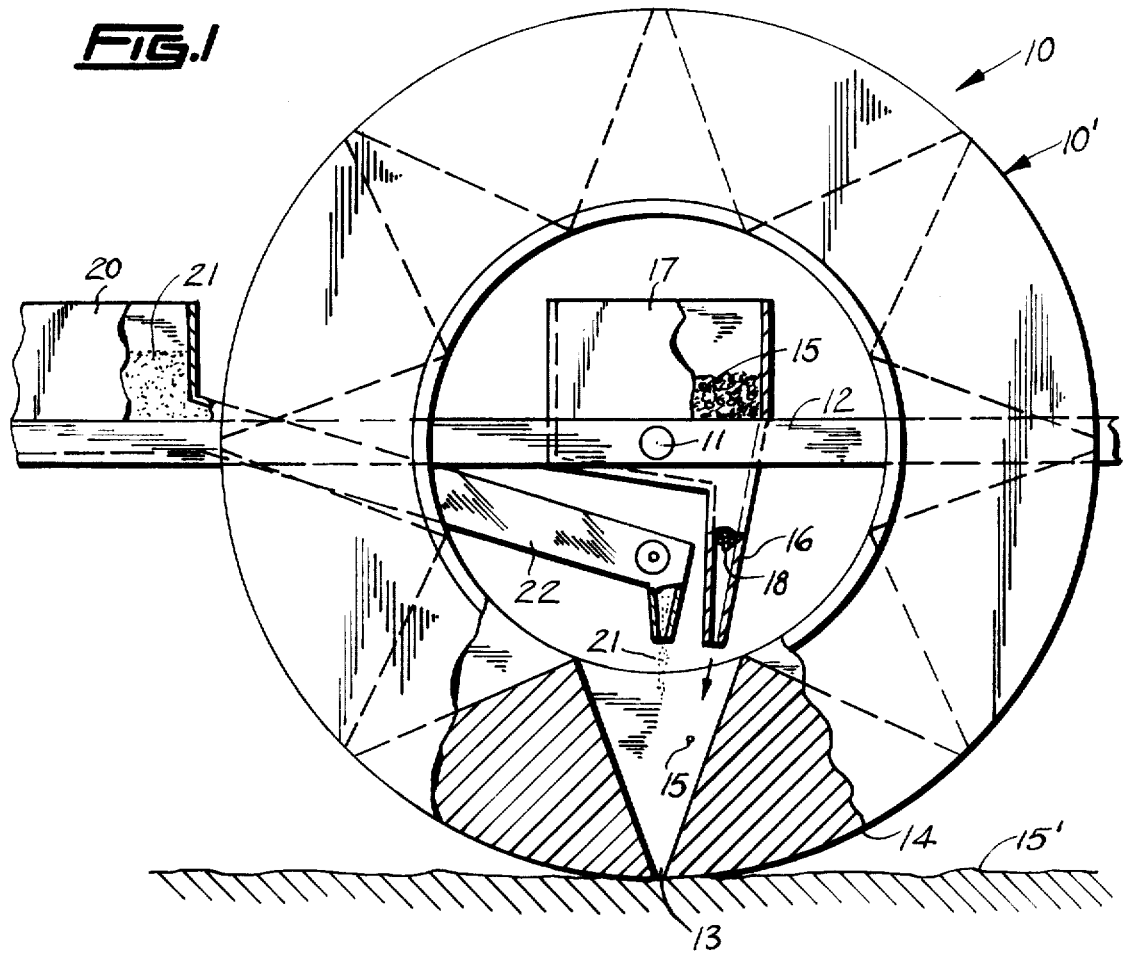
FIG. 1 is a side view of the apparatus shown partly broken away.
Figure 2:
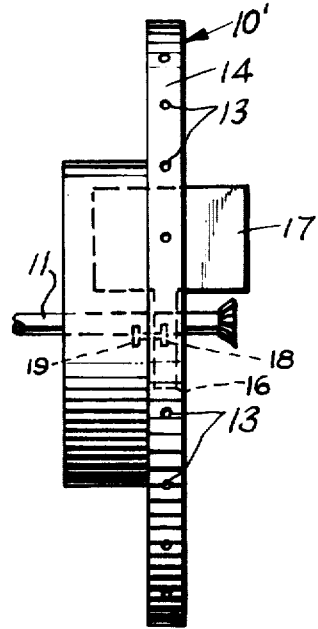
FIG. 2 is an end view of the wheel shown reduced in size and in elevation but also being removed from the frame portion of the apparatus.

According to this invention, a seed planting apparatus 10 is shown to include a wheel 10' which is mounted to an axle 11. Axle 11 is carried by the frame 12 of the apparatus 10. A plurality of tapered aperture openings 13 are equally spaced radially apart on an outer peripheral edge face 14 of the wheel 10' and allow for spacing of seed and sand which hereinafter will be described.

It shall be noted that the aperture openings 13 extend from the interior of wheel 10' through the outer periphery of wheel 10'. The seed 15 is gravity fed from chute 16 of the seed hopper 17 and the flow of seed 17 is regulated by a shafted sprocket 18 which is secured to a gear 19 which is driven by standard gear train means (not shown). The seed hopper 17 is secured to frame 12 on the interior of wheel 10' of apparatus 10 and the sand hopper 20 containing sand 21 is also secured to frame 12 but on the exterior of wheel 10'.

Figure 3:
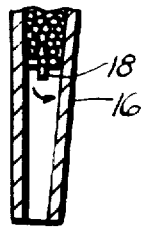
FIG. 3 is an enlarged fragmentary view of the seeh hopper chute showing the regulating sprocket.

The sand 21 is also gravity fed from hopper 20 by the same type of sprocket 18 means as shown in FIGS. 1 and 3 of the drawing.

When apparatus 10 is rolled along the ground 15' the seed 15 and the sand 21 are dispensed from their respective chutes 16 and 22, into the aperture openings 13 that are in alignment with chutes 16 and 22 and thus the seed 15 and the sand 21 are directed upon ground 15' at spaced apart intervals. After one of the apertured openings 13 receives seed 15 and sand 21 the next succeeding opening 13 will receive the same quantity of seed 15 and sand 21 thereby creating an even spacing arrangement for the proper growth of seedlings.

What I claim is:

1. A seed dispensing apparatus for properly spacing seeds along a ground for sprouting, the apparatus comprising a frame supported on a rotatable axle, a wheel fixedly secured to said axle, said wheel including a rim around a central opening, said rim having a plurality of equally spaced apart radial apertures therethrough each of which tapers radially outwardly; a seed hopper and a sand hopper stationarily mounted on said frame for dispensing seeds and sand, each said hopper having a downwardly inclined chute located within said wheel central opening so that said seeds and sand are gravity fed from said chutes into said wheel apertures as said wheel rotates while traveling upon a ground, and each chute having a regulator for controlling the amount being dispensed, the regulator comprising a toothed sprocket with teeth intercepting the chute, the sprocket being powered through a gear train of said wheel.

* * * * *